US006883908B2

(12) United States Patent
Young et al.

(10) Patent No.: US 6,883,908 B2
(45) Date of Patent: Apr. 26, 2005

(54) METHODS AND COMPOSITIONS FOR INK JET PRINTING OF PRESSURE SENSITIVE ADHESIVE PATTERNS OR FILMS ON A WIDE RANGE OF SUBSTRATES

(75) Inventors: James K. Young, Austin, TX (US); Brant U. Kolb, Afton, MN (US); Albert I. Everaerts, Oakdale, MN (US); Kevin M. Eliason, Forest Lake, MN (US); Diana M. Eitzman, Lake Elmo, MN (US); Kejian Chen, Woodbury, MN (US); John P. Banovetz, Minneapolis, MN (US); Gregory J. Anderson, Stillwater, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/756,312

(22) Filed: Jan. 8, 2001

(65) Prior Publication Data

US 2002/0128340 A1 Sep. 12, 2002

(51) Int. Cl.$^7$ .............................. B41J 2/01; B05D 1/40; C09J 11/04; C08K 3/22
(52) U.S. Cl. ...................... 347/102; 347/107; 522/77; 522/83; 522/120; 522/178; 522/181; 522/182; 427/466; 428/355 RA; 428/345
(58) Field of Search .................. 347/102, 107; 427/466, 510, 511, 516; 522/83, 77, 120, 178, 181, 182, 81; 428/345, 355 RA, 343, 355 AC; 524/847

(56) References Cited

U.S. PATENT DOCUMENTS

| | | | |
|---|---|---|---|
| 4,181,752 A | | 1/1980 | Martens et al. |
| 4,329,384 A | | 5/1982 | Vesley et al. |
| 4,330,590 A | | 5/1982 | Vesley |
| 4,374,937 A | * | 2/1983 | Nemcek et al. ............. 522/182 |
| 4,379,201 A | | 4/1983 | Heilmann et al. |
| 4,968,562 A | | 11/1990 | Delgado |
| 4,988,567 A | | 1/1991 | Delgado |
| 4,994,322 A | | 2/1991 | Delgado et al. |
| 5,045,569 A | | 9/1991 | Delgado |
| 5,053,436 A | | 10/1991 | Delgado |
| 5,086,086 A | | 2/1992 | Brown-Wensley et al. |
| 5,118,750 A | | 6/1992 | Silver et al. |
| 5,126,394 A | | 6/1992 | Revis et al. |
| 5,134,175 A | * | 7/1992 | Lucey ......................... 522/103 |
| 5,502,108 A | | 3/1996 | Silver et al. |
| 5,508,313 A | | 4/1996 | Delgado et al. |
| 5,571,617 A | | 11/1996 | Cooprider et al. |
| 5,637,646 A | | 6/1997 | Ellis |
| 5,639,546 A | * | 6/1997 | Bilkadi ....................... 428/331 |
| 5,648,407 A | * | 7/1997 | Goetz et al. ................ 523/213 |
| 5,683,501 A | | 11/1997 | Tomihisa et al. |
| 5,714,237 A | | 2/1998 | Cooprider et al. |
| 5,756,625 A | | 5/1998 | Crandall et al. |
| 5,824,748 A | | 10/1998 | Kesti et al. |
| 5,877,252 A | | 3/1999 | Tsujimoto et al. |
| 5,880,800 A | * | 3/1999 | Mikura et al. .............. 349/117 |
| 6,190,815 B1 | * | 2/2001 | Ciccarelli et al. .......... 430/108.5 |
| 6,255,363 B1 | * | 7/2001 | Baker et al. ................ 430/114 |
| 6,416,838 B1 | | 7/2002 | Arney et al. |
| 6,467,897 B1 | * | 10/2002 | Wu et al. |

FOREIGN PATENT DOCUMENTS

| | | |
|---|---|---|
| EP | 0 402 000 A1 * | 12/1900 |
| EP | 0 257 984 | 3/1988 |
| EP | 0 356 777 B1 | 9/1994 |
| EP | 0 661 311 A2 | 7/1995 |
| EP | 1 094 098 A2 | 4/2001 |
| WO | WO 94/20586 | 9/1994 |
| WO | WO 95/15266 | 6/1995 |
| WO | WO 96/01280 | 1/1996 |
| WO | WO 96/01281 | 1/1996 |
| WO | WO 97/48739 | 12/1997 |
| WO | WO 01/30872 A1 | 5/2001 |

OTHER PUBLICATIONS

"Pressure Sensitive Adhesive", Handbook of Pressure–Sensitive Adhesive Technology, Edited by D. Satas, P. 172 (1989).
ASTM D3330–90 Aug. 1990, Standard Test Method.
ASTM D3330–96 May 1996, Standard Test Method.
ASTM D3654–88 May 1988, Standard Test Method.
JP 02 011684 A (Nitto Denko Corp), Jan. 16, 1990, Abstract.

* cited by examiner

Primary Examiner—Susan Berman
(74) Attorney, Agent, or Firm—Nancy M. Lambert

(57) ABSTRACT

Methods, systems, and compositions that make it possible to form high resolution, pressure sensitive adhesive patterns or films on a wide range of substrates. The compositions generally incorporate a curable, fluid composition (i.e., pressure sensitive adhesive precursor). When cured, a pressure sensitive adhesive is formed. Ink jet printing and subsequent curing allows pressure sensitive adhesive features to be formed with high resolution and tremendous flexibility in the patterns by which adhesive features may be formed. Preferred embodiments of the invention incorporate rheology modifying agents that can be used to promote favorable dot gain and other printing characteristics, the ability to build print thickness, and mechanical properties of resultant cured adhesives.

24 Claims, No Drawings

METHODS AND COMPOSITIONS FOR INK JET PRINTING OF PRESSURE SENSITIVE ADHESIVE PATTERNS OR FILMS ON A WIDE RANGE OF SUBSTRATES

FIELD OF THE INVENTION

The present invention is in the field of forming PSAs from curable fluid precursors. More specifically, the present invention preferably relates to the use of ink jet printing applications to apply such fluid precursors onto substrates, after which the jetted material is cured to form a pressure sensitive adhesive.

BACKGROUND OF THE INVENTION

Pressure sensitive adhesives (PSAs) are used widely as patterns, shapes, and films in a wide variety of industrial and consumer applications. Techniques for creating adhesive patterns are known, including among others flexography, screen printing, spraying, and lamination of die-cut adhesives. The requirements and capabilities of each method are distinct, and have advantages and disadvantages depending on the adhesive material to be coated, the nature of the substrate onto which it is to be coated, the nature of the information to be printed, and the resolution required.

Flexographic printing and screen printing require materials with little or no crosslinking and typical viscosities in the ranges of 100 milliPascal·seconds (mPa·s) to 500 mPa·s and 2000 mPa·s to 5000 mPa·s, respectively. These techniques, which are forms of contact printing, are not well-suited for applications with short print runs due to the investment required to provide a plate or screen as well as the adhesive waste associated with changeover to different print patterns. They also may suffer from excessive adhesive build on the printing element during printing, causing excess adhesive to be printed on the substrate or build on the printing equipment, thereby causing printing defects (e.g., stringing).

Die-cutting of adhesives and subsequent lamination has been used when it is desirable to coat crosslinked, self-supporting, high performance adhesive films onto substrates. An example of this is the manufacture of membrane switches. However, die-cutting of adhesive, followed by lamination is an inherently wasteful and labor intensive step that lends itself to neither high resolution nor variable printing applications due in part to the difficulty and cost of making dies.

Noncontact printing techniques using an ink jet printer, such as ink jet imaging techniques have become very popular in commercial and consumer applications. Ink jet printers operate by ejecting a fluid (e.g., ink) onto a receiving substrate in controlled patterns of closely spaced ink droplets. By selectively regulating the pattern of ink droplets, ink jet printers can produce a wide variety of printed features, including text, graphics, images, holograms, and the like. Moreover, ink jet printers are capable of forming printed features on a wide variety of substrates, including not just flat films or sheets, but also three-dimensional objects as well.

Thermal ink jet printers and piezo ink jet printers are the two main types of ink jet systems in widespread use today. For both approaches, the jetted fluid should meet stringent performance requirements in order for the fluid to be appropriately jettable and for the resultant printed features to have the desired mechanical, chemical, visual, and durability characteristics. In particular, fluids should have relatively low viscosity when passing through the printhead, yet should be able to form accurate, durable images on the desired receiving substrate. For example, a typical fluid for thermal ink jetting typically has a viscosity in the range of 3 to 5 mPa·s measured at a shear rate of 1000 s$^{-1}$ at 25° C., while piezo ink jet fluids typically have a viscosity in the range of 1 to 30 mPa·s measured at a shear rate of 1000 s$^{-1}$ at the printhead temperature. The need to use low viscosity fluids (e.g., inks) may make it challenging to obtain printed features with sufficient thickness and resolution to achieve good mechanical, chemical, visual, adhesion, and durability characteristics.

Organic solvent-based and water-based jettable fluids are well known. A typical water-based fluid generally comprises water, optionally one or more organic co-solvents, and optionally one or more additives that are included to enhance the desired performance of the fluid. Representative examples of such additives include one or more colorants, slip modifiers, thixotropic agents, tack promoting agents, tack reducing agents, foaming agents, antifoaming agents, flow or other rheology control agents, waxes, oils, plasticizers, binders, antioxidants, fungicides, bactericides, organic and/or inorganic filler particles, leveling agents, opacifiers, antistatic agents, dispersants, and the like.

Water-based fluids have drawbacks. For industrial applications, drying is energy and equipment intensive. Drying water also takes time, and the printed material needs to be handled carefully during the relatively lengthy drying period. Water-based fluids also are compatible only with a limited range of substrates, typically those on which the water is absorbed to some degree. Images formed using water-based fluids typically require a protective overlaminate for outdoor applications.

Instead of water, other solvent-based fluids include relatively volatile, organic solvents. Such fluids dry more rapidly and easily than aqueous fluids. However, such solvents may be toxic, flammable, or the like, requiring careful handling. These fluids also tend to be compatible with only a limited range of substrates.

In order to avoid using a conventional solvent, fluid compositions incorporating a free radically polymerizable, fluid (e.g., monomers) have been developed. The fluid not only functions as a solvent, but also functions as a viscosity reducer, as a binder when cured, and optionally as a crosslinking agent. In the uncured state, these compositions have a low viscosity and are readily jettable. However, the monomers readily crosslink upon exposure to a suitable source of curing energy, e.g., ultraviolet light, electron beam energy, heat, and/or the like, to form a crosslinked polymer network.

Printed, especially ink jet printed compositions, also require good dot gain characteristics. Dot gain refers to the degree to which a printed dot spreads upon application to a substrate. If a printed feature (e.g., a dot or line) spreads too much on the substrate, the resultant image may tend to have poor resolution. On the other hand, if a printed feature spreads insufficiently upon application to the substrate, poor image density may result.

Ink jetting theoretically would allow PSAs to be printed onto a wide range of substrates to form high resolution adhesive patterns. However, inherently sticky materials are difficult to jet with any success. Firstly, to jet properly, the material should have low elasticity and low viscosity when jetted and should not have a tendency to plug up the orifices of the printhead. Inherently sticky materials fail to satisfy these criteria.

Additionally, the material should hold itself together without too much dot gain. If the material flows away from the targeted area too readily, forming accurate adhesive patterns is not possible. Further, the printed material should be thick enough to build sufficient z-axis height to function as a PSA. Unfortunately, materials that jet readily through ink jet printheads have low viscosities, flow readily, and generally do not satisfy these capabilities.

In particular, it is generally important to build print thickness of PSAs in order to realize the desired adhesive properties. Using inkjet technology, printed dot sizes of 30 to 50 micrometers diameter may be routinely achieved. However, it is very difficult to achieve the desired thickness (i.e., greater than about 10 micrometers) without a simultaneous loss of resolution due to dot spreading. That is, repeated overprinting of adhesive dots causes the material in the drops to spread sideways on the substrate, enlarging the dot size.

PCT Publication No. WO 95/15266 A describes ink jet printing of radiation curable composition having adhesive properties. However, such composition does not form a PSA when cured, but rather a non-tacky film or other cured body. The document also does not describe incorporating any kind of rheology modifying agent into the composition in order to control characteristics such as viscosity, dot gain, thixotropy, and/or the like.

Patterned application of high performance PSAs (i.e., those PSAs having high tack, high bond strength, and low creep) is important to the manufacture of laminated devices such as, for example, membrane switches and graphic articles such as substrateless labels and graphics. It would be desirable to have a method such as ink jetting that can variably print PSAs by a non-contact method onto a wide range of substrates in a wide range of patterns.

SUMMARY OF THE INVENTION

The present invention provides methods, systems, and compositions that make it possible to form high resolution, pressure sensitive adhesive (PSA) patterns or films on a wide range of substrates. Preferably, energy curable compositions are formulated with thickening or thixotropic properties such that the compositions tend to exist as a thickened fluid or a gel in one state, but exist as a low viscosity fluid when subjected to a threshold level of suitable energy (e.g., shear, thermal, sonic, and/or the like). As a consequence, the compositions may be ink jetted as a low viscosity fluid when subjected to, for example, the shear and/or thermal energy of an ink jet printhead, but then quickly thicken or gel after being printed to minimize dot gain. After being printed in this way, the resultant printed material may be cured with energy to form a PSA. The PSAs of the present invention may be advantageously used in a wide range of applications, including forming adhesive areas for decals, labels, equipment assembly, electronics including flexible circuitry, liquid crystal displays, office supplies, adhesive tapes, protective films, greeting cards, paper goods, other printed items, abrasives (e.g., sandpaper, polishing pads), and the like.

In one aspect, the present invention relates to a method of forming a PSA composition on a substrate. A curable, fluid composition is provided that forms a PSA upon curing. The composition is ink jet printed onto the substrate. The composition is cured under conditions effective to form a PSA.

In another aspect, the present invention relates to a method of forming a PSA composition on a substrate. A rheology-modified, curable, fluid composition that forms a PSA when cured is provided. The precursor includes a radiation curable fluid that forms a PSA upon curing and at least a thickening amount of a rheology modifying agent. The composition is ink jet printed onto the substrate. The composition is then cured under conditions effective to form a PSA.

In another aspect, the present invention relates to a curable composition that forms a PSA upon curing. The composition includes a curable, fluid PSA precursor and a plurality of nanometer-sized particles that are marginally compatible with the fluid precursor and are present in an amount such that the composition has a first state in which the composition is a gel and a second, fluid state.

In another aspect, the present invention relates to a curable composition that forms a PSA upon curing. The composition includes a curable, fluid PSA precursor and a plurality of nanometer-sized, surface-treated particles incorporated into the precursor in an amount effective to alter a rheological characteristic of the precursor.

In another aspect, the present invention relates to a method of making a curable composition that forms a PSA upon curing. A plurality of nanometer-sized, surface-treated particles are incorporated into a curable, PSA precursor.

In another aspect, the present invention relates to a curable composition that forms a PSA upon curing. The composition includes a curable, fluid PSA precursor comprising a first, relatively polar, constituent and a second, relatively nonpolar constituent, wherein at least one of said constituents is curable. The composition also includes a rheology modifying agent comprising surface-treated, nanometer-sized inorganic oxide particles comprising relatively polar and nonpolar surface portions in relative amounts effective to render the rheology modifying agent marginally compatible with the fluid.

In another aspect, the present invention relates to a method of making a composition that forms a PSA upon curing. A curable, fluid PSA precursor is provided that includes a first, relatively polar, constituent and a second, relatively nonpolar constituent, wherein at least one of said constituents is curable. A rheology modifying agent is provided that comprises surface-treated, nanometer-sized, inorganic oxide particles comprising relatively polar and nonpolar surface portions in relative amounts such that the rheology modifying agent is marginally compatible with the fluid. A rheology modifying amount of the agent is incorporated into the precursor.

In another aspect, the present invention relates to a method of forming a PSA. A composition is provided that includes a curable, PSA precursor and a plurality of surface-treated, nanometer-sized, inorganic oxide particles. The composition is printed onto a substrate to form a printed feature. The printed feature is cured, whereby a PSA is formed.

In another aspect, the present invention relates to a printed feature. The feature includes a cured PSA a plurality of surface-treated, nanometer-sized, inorganic oxide particles incorporated into the adhesive.

In another aspect, the present invention relates to a PSA composition comprising a polymer and a plurality of surface-treated, nanometer-sized, inorganic oxide particles incorporated into the adhesive.

DETAILED DESCRIPTION OF PREFERRED EMBODIMENTS

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

As used herein the term "Pressure Sensitive Adhesive" means materials meeting the Dahlquist criterion as described in the *Handbook of Pressure-Sensitive Adhesive Technology*, Edited by D. Satas, p. 172, (1989) at use temperatures.

"Molecular weight" as used throughout this specification means number average molecular weight unless expressly noted otherwise.

As used herein, the term "monomer" means a relatively low molecular weight material (i.e., having a molecular weight less than about 500 grams/mole) having one or more radiation polymerizable groups.

"Oligomer" means a relatively intermediate molecular weight (i.e., having a molecular weight of from about 500 up to about 10,000 grams/mole) material optionally having one or more radiation polymerizable groups and/or other functionality.

"Polymer" means a molecule comprising a relatively high molecular weight (i.e., having a molecular weight of at least about 10,000 grams/mole or more, preferably up to about 100,000 grams/mole) and optionally having one or more radiation polymerizable groups and/or other functionality.

"Oligo/resin" refers collectively to oligomers and polymers.

Curable, Fluid Composition

In general, compositions of the invention comprise a curable, fluid composition that forms a pressure sensitive adhesive (PSA) upon curing (hereinafter referred to sometimes as "PSA precursor" or "precursor"). Preferably, the fluid is a liquid. The PSA precursor of the present invention is any suitable fluid comprising energy curable functionality capable of forming at least a portion of a PSA upon curing. Preferably such compositions have an ink jettable viscosity at the desired printhead temperature and shear rate.

The energy source used for achieving polymerization and/or crosslinking of the curable functionality may be actinic (e.g., radiation having a wavelength in the ultraviolet or visible region of the spectrum), accelerated particles (e.g., electron beam radiation), thermal (e.g., heat or infrared radiation), or the like. Preferably, the energy is actinic radiation or accelerated particles, because such energy provides excellent control over the initiation and rate of polymerization when radiation curable functionality is used. Additionally, actinic radiation and accelerated particles can be used for curing at relatively low temperatures. This avoids degrading and/or evaporating components that might be sensitive to the relatively high temperatures that might be required to initiate polymerization of the curable groups when using thermal curing techniques.

Preferably, the fluid is radiation curable, having radiation curable functionality. In the practice of the present invention, "radiation curable" refers to functionality directly or indirectly pendant from a monomer, oligomer, polymer, or surface-treated particle (as the case may be) that participate in polymerization and/or crosslinking reactions upon exposure to a suitable source of radiation. Such functionality generally includes not only groups that polymerize or crosslink via a cationic mechanism upon energy exposure, but also groups that polymerize or crosslink via a free radical mechanism.

Suitable sources of curing energy include lasers, electron beams, mercury lamps, xenon lamps, carbon arc lamps, tungsten filament lamps, sunlight, and the like. Ultraviolet radiation, especially from a low intensity black light, is most preferred in that such energy tends to form PSAs with high molecular weight.

Representative examples of energy curable groups suitable in the practice of the present invention include epoxy groups, (meth)acrylate groups, olefinic carbon-carbon double bonds, allyloxy groups, alpha-methyl styrene groups, (meth)acrylamide groups, cyanate ester groups, vinyl ether groups, combinations of these, and the like. Free radically polymerizable groups are preferred. Those having (meth) acryl moieties are most preferred. The term "(meth)acryl", as used herein, encompasses acryl and methacryl.

Preferred curable fluids are radiation curable monomers that comprise (meth)acryl functionality and generally undergo curing reactions via a free radically polymerization mechanism. Radiation curable monomers that are curable via free radically polymerization mechanisms and that form PSAs when cured are well know in the art and may include (meth)acrylates, (meth)acrylamides, olefins, styrene and substituted styrenes, vinyl ethers, vinyl esters, N-vinylamides, N-vinyllactams, and the like.

Preferably, free-radically polymerizable monomers useful in practice of the present invention have the following general structure:

$$[A]_{m\text{-}B}$$

where A represents a free-radically reactive functional group, m is a number of at least one, preferably 1 to 4, and B represents an m-valent radical that is largely free of moieties or substituents that significantly absorb radiation at the wavelength of the chosen curing energy. These monomers may be mono-, di-, or otherwise polyfunctional (i.e., having two, or three or more free-radically reactive functional A groups, respectively).

Monofunctional (meth)acrylate monomers useful in the invention include compositions of Formula I where A comprises $H_2C$=CRC(=O)O—, where R is any suitable monovalent moiety such as a hydrogen atom or a straight, branched, or cyclic lower alkyl, hydroxyalkyl, or the like; m is 1; and B comprises a monovalent moiety such as a straight chain alkyl, branched alkyl or cycloalkyl group having from about 1 to about 24 carbon atoms, preferably at least 6 carbon atoms. In some embodiments, B may comprise one or more heteroatoms.

Examples of such monofunctional (meth)acrylate monomers include, but are not limited to, methyl (meth)acrylate, isooctyl (meth)acrylate, 4-methyl-2-pentyl (meth)acrylate, 2-methylbutyl (meth)acrylate, 2-ethylhexyl (meth)acrylate, isoamyl (meth)acrylate, isononyl (meth)acrylate, isodecyl (meth)acrylate, isobornyl (meth)acrylate, sec-butyl (meth) acrylate, n-butyl (meth)acrylate, tert-butyl (meth)acrylate, butyl (meth)acrylate, ethyl (meth)acrylate, dodecyl (meth) acrylate, octadecyl (meth)acrylate, cyclohexyl (meth) acrylate, mixtures thereof, and the like. Preferred monofunctional (meth)acrylate monomers include those selected from isooctyl (meth)acrylate, isononyl (meth)acrylate, isoamyl (meth)acrylate, isodecyl (meth)acrylate, 2-ethylhexyl (meth)acrylate, isobornyl (meth)acrylate, n-butyl (meth) acrylate, sec-butyl (meth)acrylate, mixtures thereof, and the like.

Preferably, difunctional and higher polyfunctional (meth) acrylate free radically polymerizable monomers are included in the precursor of the invention. These include ester derivatives of alkanediols, alkanetriols, alkanetetrols, etc. (e.g., 1,4-butanediol di(meth)acrylate, 1,6-hexanediol di(meth)acrylate, trimethylolpropane tri(meth)acrylate, and pentaerythritol tri(meth)acrylate). Difunctional and polyfunctional (meth)acrylate monomers described in U.S. Pat. No. 4,379,201 (Heilmann et al.), such as 1,2-ethanediol di(meth)acrylate; 1,12-dodecanediol di(meth)acrylate; and pentaerythritol tetra(meth)acrylate can also be used in the present invention.

Vinyl ester monomers of the invention include compositions of Formula I where A represents $H_2C=CHOC(=O)-$, m=1, and B represents a monovalent straight chain or branched alkyl group having from about 1 to about 24 atoms. Such vinyl ester monomers include but are not limited to vinyl acetate, vinyl 2-ethylhexanoate, vinyl caproate, vinyl laurate, vinyl pelargonate, vinyl hexanoate, vinyl propionate, vinyl decanoate, vinyl octanoate, and other monofunctional unsaturated vinyl esters of linear or branched carboxylic acids comprising 1 to 16 carbon atoms. Preferred vinyl ester monomers include vinyl laurate, vinyl caproate, vinyl 2-ethylhexanoate, and mixtures thereof.

Vinyl ethers can also be used. Examples of suitable vinyl ethers include, methyl vinyl ether, ethyl vinyl ether, isobutyl vinyl ether, hexanediol divinyl ether, combinations thereof, and the like.

Other suitable monomers for the curable fluid include monofunctional monomers that are readily copolymerizable with (meth)acrylate and vinyl ester monomers and that are largely free of moieties or substituents that significantly absorb radiation at the wavelength of the chosen actinic radiation source. Such monomers include, but are not limited to, (meth)acrylic acid, itaconic acid, crotonic acid, maleic acid, fumaric acid, sulfoethyl (meth)acrylate, N-vinylpyrrolidone, N-vinylcaprolactam, (meth)acrylamide, N-(t-butyl) (meth)acrylamide, N,N-dimethylaminoethyl (meth)acrylamide, N,N-dimethylaminoethyl (meth)acrylate, N-octyl(meth)acrylamide, N,N-dimethyl (meth)acrylamide, hydroxyethyl (meth)acrylate, hydroxypropyl (meth)acrylate, mixtures thereof, and the like. Of these, (meth)acrylic acid, N-vinylpyrrolidone, and mixtures thereof are preferred.

The curable compositions generally comprise about 60 to about 99 weight percent of the curable, PSA precursor, preferably about 75 to about 99 weight percent, most preferably about 80 to about 98 weight percent, based upon the total weight of the composition.

Rheology Modifying Agent

Preferred compositions of the present invention further comprise a rheology modifying agent incorporated into the PSA precursor. The rheology modifying agent of the present invention is generally any agent comprising one or more components that may be incorporated into the precursor in a manner effective to cause the precursor to be thickened, rendered thixotropic, or caused to be a gel, at least under certain circumstances, relative to an otherwise identical composition lacking such an agent. More preferably, the rheology modifying agent is a thixotropic agent such that the composition exhibits thixotropic, preferably shear-thinning characteristics. Thixotropy is very desirable as a characteristic of the composition. Thixotropic compositions are easily converted between a thickened state, preferably a gel phase, and a relatively low viscosity, fluid state to facilitate printing onto substrates. Generally, adding energy (e.g., shear energy, sonic energy, thermal energy, and/or the like) to the composition causes the composition to be in the low viscosity, fluid state. Upon cooling or removing such shear, thermal, sonic or other energy, the compositions tend to return to the thickened state. The viscosity change is preferably reversible so that the composition can be in one state or the other, as desired.

Thixotropic characteristics provide many advantages for inkjet applications, including controlled dot gain, enhanced ability to rapidly print fine features, and enhanced ability to build print thickness. During ink jetting, the shear force associated with jetting causes the compositions to be in a low viscosity state. After jetting, the compositions quickly thicken or gel (as the case may be) on the substrate for accurate, precision placement, and then may be cured to form preferred high performance (aggressive tack, high peel strength, high shear strength) PSAs. The thixotropic properties of the compositions are also useful in screen printing, spin coating, fabricating microelectronic circuits, and other printing applications.

Thus, it can be appreciated that a wide variety of rheology modifying agents may be used in the practice of the present invention. Suitable rheology modifying agents include, but are not limited to, inorganic oxide particles such as titanium dioxide, silica, fumed silica, combinations of these, and the like; surface-treated inorganic oxide particles; polymeric microspheres; natural or synthetic gums; other oligomers or polymers ("oligo/resins"); combinations of these, and the like.

Preferred rheology modifying agents are nanometer-sized. The term "nanometer-sized" for purposes of the present invention refers to particles that are characterized by an average particle diameter in the range of from about 5 nanometers to about 500 nanometers, more preferably about 5 nanometers to about 200 nanometers, even more preferably 5 nanometers to 100 nanometers. These size ranges facilitate ease of dispersion of the particles into the fluid, which preferably comprises a radiation curable binder precursor. Nanometer-sized particles are also easily jetted through the orifices of conventional ink jet printheads.

In the practice of the present invention, particle size may be determined using any suitable technique. Preferably, particle size refers to the number average particle size and is measured using an instrument that uses transmission electron microscopy or scanning electron microscopy. Another method to measure particle size is dynamic light scattering, which measures weight average particle size. One example of such an instrument found to be suitable is the N4 PLUS SUB-MICROMETER particle analyzer available from Beckman Coulter Inc. of Fullerton, Calif.

Rheology modifying agents of the present invention in the form of particles may have a wide variety of shapes or combinations of shapes. For example, such particles may be spherical, oblong, irregular, platelet-shaped, polygonal, and/or the like. Particles that are rounded, more preferably at least substantially spherical, are most preferred. As desired, the particles may also have single or multimode particle distributions.

Generally, the rheology modifying agent is incorporated into the composition at least in an amount effective to provide the desired rheological behavior, e.g., general thickening and/or thixotropy and/or gelation. The amount of the agent needed to achieve a desired behavior will vary depending upon the agent that is used, the nature of the curable precursor, and the nature of the other ingredients that are included in the composition. As general guidelines, preferred thickening amounts of a rheology modifying agent may range from about 0.1 to about 40 weight percent of the composition.

Fumed silica is one preferred thickening agent that may be used as all or a portion of the rheology modifying agent and provides general thickening even when present in relatively low amounts. Fumed silica may be hydrophilic or hydrophobic, both types being commercially available. If used, fumed silica preferably may be about 0.1 to about 10, preferably about 2 to about 6 weight percent of the composition. To prevent agglomeration and/or aggregation, the fumed silica may be dispersed in the fluid with the help of a suitable dispersant or surface treatment.

Surface-treated, nanometer-sized, inorganic oxide particles (preferably prepared from a colloidal sol) may also be used as all or a portion of the rheology modifying agent. Specific embodiments of particularly preferred surface-treated, nanometer-sized inorganic oxide particles that provide the precursor with reversible gel characteristics are described in Assignee's Copending Application having U.S. Ser. No. 09/756,303 titled ENERGY CURABLE INKS AND OTHER COMPOSITIONS INCORPORATING SURFACE MODIFIED, NANOMETER-SIZED PARTICLES, said application being incorpoiated herein by reference in its entirety. Compositions of the invention that incorporate these preferred particles have very desirable rheological properties. If used, such surface-treated, nanometer-sized inorganic oxide particles may be about 0.1 to about 40, preferably about 15 to about 30 weight percent of the composition.

In more detail, preferred surface modifications of the present invention that provide thixotropic properties generally result by treating the substrate particles with one or a mixture of two or more surface treatment agents of differing degrees of compatibility with the fluid (e.g., polarity, solubility, or the like). The use of combinations of surface treatment agents allows degree of compatibility with the fluid to be adjusted until the desired rheological characteristics are obtained.

Preferably, a combination comprising relatively polar and nonpolar surface treatments are used, and the fluid comprises relatively polar and nonpolar constituents. In general, the more polar the fluid, the higher is the relative amount of the relatively polar surface treatment agent to be used. Of course, as another option in certain cases, a single surface modification component may also be used. At least one constituent of the particularly preferred fluids also desirably comprises radiation curable functionality, in which case the fluid functions as a radiation curable binder precursor. More preferably, both nonpolar and polar constituents of the fluid are radiation curable. Such embodiments are described further below.

Formulations of compositions of the present invention with thickening, gelling, and/or thixotropic characteristics may preferably be obtained according to the following screening methodology. First, a first fluid component (e.g., liquid monomer), which preferably is the major component of the fluid, is selected. Then, a screening test is conducted to assess the compatibility between this first component and various surface-modified nanoparticles obtained by using various ratios of two or more, preferably two, surface treatment agents to find particular ratios of surface treatment agents that produce a well-dispersed, fluid sol of the particles incorporated into the first component. This screening typically is carried out using about 15 to about 60 weight percent of the surface-treated particles dispersed in the first fluid component.

To carry out such methodology, the surface treatment agents are selected such that at least one is relatively polar and at least one is relatively nonpolar. The rheological characteristics of different molar ratios of such agents are then assessed. For example, the various molar ratios of the relatively polar surface treatment agent to relatively nonpolar surface treatment agent used for the screening test may be, for example, 100:0, 90:10, 80:20, 70:30, 60:40, 50:50, 40:60, 30:70, 20:80, 10:90, or 0:100, respectively. It has been found, typically, that if the main component of the fluid is a nonpolar fluid, the preferred surface-modified nanoparticles will have a majority of nonpolar functionality on their surface when compared to polar functionality (and vice versa). Preferably, the surface treatment agents are used in amounts such that the particle surface coverage is less than or equal to about 110 percent, and more preferably from about 90 to about 100 percent of the amount needed for monolayer coverage of the particles to be surface-treated. The term "monolayer coverage" refers to the maximum amount of coupling agent that chemically reacts with the particles in the composition.

As used in the context of the present invention, the terms "polar" and "nonpolar" refer to the degree of charge polarization or dipole moment associated with a material. For example, for a surface treatment agent, the pertinent constituent for which polar or nonpolar character is important is associated with the pendant moiety of the particle-bound coupling agent (i.e., the portion that contacts the fluid ). It should be noted that polarity differences need only be relative, not absolute. Thus, for the coupling agent pair 3-methacroyloxypropyltrimethoxysilane/isooctyltrimethoxysilane, the 3-methacroyloxypropyltrimethoxysilane is the relatively polar component. For the coupling agent pair methacroyloxypropyltrimethoxysilane/N-(3-triethoxysilylpropyl) methoxyethoxyethyl carbamate, the methacroyloxypropyltrimethoxysilane is the relatively nonpolar component. Similarly, for a fluid including the monomer pair isobornyl acrylate and N-octylacrylamide, N-octylacrylamide is the relatively polar component.

Such screening should allow one to identify one or more different kinds of surface-treated particles that are compatible with the first fluid component. Having identified such compatible surface-modified particles, a sol of the compatible surface-modified particles in the first fluid component is prepared at a higher concentration of the compatible surface-modified nanoparticles than desired in the final composition. For example, if about 20 to about 25 weight percent of surface-treated particles is desired in the final composition, the sol used in the present methodology may be formulated with about 30 to about 50 weight percent of particles.

Next, a series of formulations is prepared by adding a second fluid component to the sol of the compatible surface-modified particles in the first fluid component. The second fluid component is selected so as to have a relatively different polarity than the first fluid component. However, the degree of polarity should not be so different that the two fluid components are immiscible with each other. Preferably, the first and second fluid components are fully miscible. The rheology of the resultant compositions is evaluated to see if the desired behavior results. As the ratio of this second component is increased relative to the first fluid component, the compatibility of the particles in the system will tend to decrease. This results in an increase in viscosity, leading to a gel in some instances. The sample can be heated and cooled one or more times to check for thermo-reversible character. By this method, it is possible to easily obtain thermally reversible gels and thickened compositions according to the invention.

Preferably, formulations are selected in which the particles are marginally compatible with the precursor. "Marginally compatible" means that addition of the particles to a fluid helps at least in part to cause the resultant composition to have a state in which the composition exhibits a greater degree of thixotropic, thickening, gelling, and/or shear-thinning characteristics as compared to a fluid lacking such particles. Preferably, "marginally compatible" means that addition of the particles to a fluid helps, at least in part, to cause the resultant composition to have a state in which the composition is a thermally reversible gel and/or a shear-thinning gel. Advantageously, such compositions in preferred embodiments may exist as thickened or gelled materials in one state, but can be reversibly converted into low viscosity fluids when subjected to a sufficient amount of energy, e.g., heating, sonication, shearing, or the like.

If the gelling characteristics are too strong such that gelling results but is not reversible via application of shear-thinning and/or thermal energy, then increments of the more compatible fluid component can be added until reversibility is obtained. The magnitude of reversibility can vary greatly with only small differences in fluid component ratio. Additionally, if too much of the second component is added, the particles may begin to phase separate on a more macroscopic level. This may cause the sol to become more viscous and/or hazy than is desired. Eventually, a macroscopically phase-separated system (e.g., precipitate) may be formed.

As still another approach, the above methodology can be followed except that it is possible to start with the particles dispersed in the more incompatible fluid component. Increments of the more compatible fluid component may then be added until the desired degree of reversible gel characteristics is obtained. In another approach, it is possible to adjust the polar/nonpolar characteristics of both the fluid and the surface modifiers, although it is simpler in practice to vary only one of these.

The above described methodology is one way to obtain gels according to the present invention (i.e., by adjusting the relative amounts of the polar/non-polar constituents of the fluid). Alternatively, the fluid (i.e., solvent system) may be held constant while the ratio of two different surface modifiers can be varied to adjust the compatibility.

For example, according to the approach in which the relative amounts of the polar/nonpolar surface modifiers is adjusted while holding the nature of the fluid constant, a screening test is conducted using various ratios of surface treatment agents to find combination(s) of such agents that produce a sol in the fluid, typically when the modified particles in the composition are present in the range of about 15 to about 40 weight percent. The surface treatment agents are selected such that at least one is relatively polar and at least one is relatively nonpolar. For example, the various molar ratios used to evaluate two surface treatment agents may be, for example, 100:0, 90:10, 80:20, 70:30, 60:40, 50:50, 40:60, 30:70, 20:80, 10:90, or 0:100 of the relatively polar surface treatment agent to the relatively nonpolar surface treatment agent.

Preferably, regardless of the screening method used to identify formulations of the present invention, the surface treatment agents are used in amounts such that the particle surface coverage is less than or equal to about 110 percent of the amount needed for monolayer coverage. The preferred molar ratio of relatively polar to relatively non-polar surface treatment agent will generally be between those ratios having compatibility (e.g., low viscosity, clarity) in the fluid and those having incompatibility (e.g., precipitation). In this manner, the range of ratios to investigate may be narrowed, and the screening process may be repeated one or more times until a ratio of surface treatment agents is arrived at that leads to gel formation. Preferred substrate particles that are surface treatable in accordance with the present invention comprise nanometer-sized, inorganic oxide particles such as silica; metal oxides such as alumina, tin oxide, iron oxide, zirconia, vanadia, and titania; combinations of these; and the like. Silica is the most preferred substrate particle.

Surface treatment of the substrate particles in accordance with the present invention significantly alters the rheological behavior of compositions incorporating such particles. Untreated substrate particles, especially silica, tend to form permanent clusters of aggregated particles that are incompatible with many fluids. These can settle, clog printheads and/or impair transparency. This is extremely undesirable in ink jetting applications. When compositions including such aggregates are filtered through a one-micrometer filter, a substantial portion of the particle content of the compositions is prevented from passing through the filter.

In sharp contrast, marginally compatible surface-treated particles of the present invention tend to form non-permanent agglomerations (as opposed to aggregates) of particles in the absence of imparted energy, but readily break up in the presence of shear, sonic, thermal, or other energy into small enough particles. The compositions may be passed through a one-micrometer, preferably 0.45-micrometer, filter with substantially no loss, if any, of particle content. Such compositions also tend to exhibit shear-thinning behavior at relatively high concentrations.

If not already surface-treated in the manner desired, the substrate particles preferably are provided as a sol rather than as a powder or a gel. Preferred sols generally contain from about 15 to about 50 weight percent of colloidal inorganic oxide particles dispersed in a liquid medium. Representative examples of suitable liquid media for the colloidal particles include water, aqueous alcohol solutions, lower aliphatic alcohols, ethylene glycol, N,N-dimethylacetamide, formamide, and combinations thereof The preferred liquid medium is aqueous, e.g., comprising water and optionally one or more alcohols. When the colloidal particles are dispersed in an aqueous solvent, the particles are stabilized on account of common electrical charges that develop on the surface of each particle. The common electrical charges tend to promote dispersion rather than agglomeration or aggregation, because the similarly charged particles repel one another. By contrast, fumed silica and silica gel are aggregates of fused particles and, thus, will not as easily provide a uniform dispersion of particles when combined with the binder precursor. Such aggregates also are too big to be conveniently ink jetted.

Sols useful in the practice of the present invention may be prepared by methods well known in the art. Suitable sols also are commercially available. For example, colloidal silicas in aqueous solutions are commercially available under such trade designations as "LUDOX" (E.I. DuPont de Nemours and Co., Inc., Wilmington, Del.), "NYACOL" (Nyacol Co., Ashland, Mass.), and "NALCO" (Nalco Chemical Co., Oak Brook, Ill.). Most of these commercially available sols tend to be basic, being stabilized by alkali such as sodium hydroxide, potassium hydroxide, or ammonium hydroxide. Additional examples of suitable colloidal silicas are described in U.S. Pat. No. 5,126,394.

The sols used in the present invention generally include countercations in order to counter the surface charge of the colloids. Depending upon pH and the kind of colloids being used, the surface charges on the colloids can be negative or positive. Thus, either cations or anions are used as counter ions. Examples of cations suitable for use as counter ions for negatively charged colloids include $Na^+$, $K^+$, $Li^+$, a quaternary ammonium cation such as $NR_4^+$, wherein each R may be any monovalent moiety, but preferably H or a lower alkyl such as $CH_3$, combinations of these, and the like. Examples of counter anions suitable for use as counter ions for positively charged colloids include nitrate, acetate, chloride, etc.

Preferred treatment agents may be represented schematically by the following formula:

wherein A is the attachably reactive moiety, s is at least 1 to 4, preferably 1; W is a relatively polar or relatively nonpolar moiety (as the case may be) having a valency of r+s, and preferably having a skeleton comprising about 2 to about 30, more preferably about 3 to about 20 carbon atoms; X is a moiety comprising suitable curing functionality such as a (meth)acryl moiety; and r is 0 to about 4, preferably 0 or 1. The attachably reactive moiety A may be monovalently or multivalently (i.e., if A were to be cyclic) linked to W. If A is divalent, for example, both valent sites preferably are linked to W directly.

When preferred embodiments of inorganic particles comprise silica, the attachably reactive moiety A is preferably a silane-functional moiety. As used herein, the term "silane-functional moiety" refers to a hydrolyzable moiety comprising at least one silicon atom bonded to at least one oxygen atom in which the oxygen atom preferably is a constituent of an acyloxy group and/or an alkoxy group. Thus, representative examples of preferred silane-functional moieties may be represented by the following formulae:

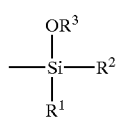

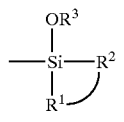

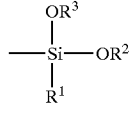

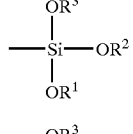

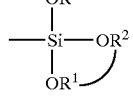

Generally, any of $R^1$, $R^2$, and $R^3$ of these silane-functional moieties independently may be any nonionic, monovalent substituent (or divalent substituent when $R^1$ and $R^2$ collectively form a cyclic substituent as in Formula (2)) other than hydrogen. Additionally, any of $R^1$, $R^2$, and $R^3$ may be linear, branched, or cyclic. Thus, representative examples of moieties suitable for use as any of $R^1$, $R^2$, $R^3$, include any alkyl, aryl, alkaryl, acyl, alkenyl, arylene moieties, combinations thereof, or the like. Any of such moieties, if cyclic, may include a plurality of rings if desired. For example, aryl moieties may be aryl-aryl structures. In preferred embodiments, each of $R^1$, $R^2$, and $R^3$ is independently an alkyl group of 1 to 4 carbon atoms or an acyl group such as acetyl ($CH_3C(=O)—$) or substituted or unsubstituted benzoyl ($C_6H_5C(=O)—$). Most preferably, each of $R^1$, $R^2$, and $R^3$ independently is a lower alkyl group of 1 to 4 carbon atoms, more preferably $CH_3$.

Representative embodiments of surface treatment agents include organosilanes such as, for example, isooctyl trimethoxy-silane, N-(3-triethoxysilylpropyl) methoxyethoxyethoxyethyl carbamate (PEG3TMS), N-(3-triethoxysilylpropyl) methoxyethoxyethoxyethyl carbamate (PEG2TMS), 3-(methacroyloxy)propyltrimethoxysilane, 3-acryloxypropyltrimethoxysilane, 3-(methacroyloxy) propyltriethoxysilane, 3-methacroyloxy) propylmethyldimethoxysilane, 3-(acryloxypropyl) methyldimethoxysilane, 3-(methacroyloxy )propyldimethylethoxysilane, 3-(methacroyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethylsilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltrisisobutoxysilane, vinyltriisopropenoxysilane, vinyltris(2-methoxyethoxy)silane, and mixtures thereof Pairs of relatively polar and nonpolar surface treatment agents may be selected from these and similar materials.

Desirably, at least one surface treatment agent, when coupled to the particles, helps to provide steric bulk to prevent particle agglomeration. For example, to promote this function, such surface treatment agent may preferably include two desirable features. First, W preferably includes a branched skeleton to help occupy steric volume. Secondly, the moiety W is relatively large to expand the steric volume of the surface-treated particles.

In alternative embodiments, polymeric microspheres also may be advantageously incorporated into the precursor as all or a portion of the rheology modifying agent. These may be of the tacky or non-tacky variety. The microspheres may also include functionality to enhance the performance of the curable composition or the resultant cured PSA. For example, such microspheres may include radiation curable functionality to allow the microspheres to crosslink with other radiation curable ingredients for additional reinforcement. Other functionality that may be present on the microspheres includes ethylenic unsaturation, hydroxyl, acid, amino, quaternary ammonium, combinations of these, and the like. Depending upon the surface characteristics of the microspheres and upon the nature of the other ingredients of the precursor, the microspheres can function as general thickening agents or more preferably as thixotropic agents.

A wide range of polymeric microspheres are known and can be used in the invention. Representative examples of polymeric microspheres have been fully described in PCT Patent Publication Nos. WO 94/20586 describing tacky polymeric microspheres; WO 97/48739 describing polyolefin microspheres; and WO 96/01281 and 96/01280 describing tacky microspheres derived from vinyl ester monomers. Representative examples of polymeric microspheres have been described in U.S. Pat. No. 5,877,252 describing water-based microsphere adhesives; U.S. Pat. No. 5,824,748 describing composite PSA microspheres; U.S. Pat. No. 5,756,625 describing stabilized adhesive microspheres; U.S. Pat. No. 5,714,237 describing partially crosslinked microspheres; U.S. Pat. No. 5,571,617 describing tacky, surface active microspheres; U.S. Pat. No. 5,508,313 describing tacky microspheres with pendant hydrophilic moieties; U.S.

Pat. No. 5,502,108 describing solid tacky microspheres; U.S. Pat. No. 5,118,750 describing solid tacky microspheres; and U.S. Pat. Nos. 5,053,436, 5,045,569, 4,988,567, 4,994,322, and 4,968,562 describing hollow (meth) acrylate polymer microspheres. Representative examples of resilient polymeric microspheres have been described in European Patent Document No. 0 257 984.

In other embodiments, all or a portion of the rheology modifying agent incorporated into the PSA precursor may include one or more oligo/resins. Preferred oligo/resins have a number average molecular weight below about 100,000 grams/mole, preferably from about 500 to about 30,000 grams/mole, and more preferably from about 700 to about 10,000 grams/mole. One or more oligo/resins may be incorporated into fluid compositions of the present invention in order to provide many benefits, including viscosity control, reduced shrinkage upon curing, durability, flexibility, outdoor weatherability, and/or the like. Oligo/resins suitable in the practice of the present invention may be polyurethanes, (meth)acrylic materials, polyesters, polyimides, polyamides, epoxies, polystyrene, styrene and substituted styrene containing materials, silicone containing materials, fluorinated materials, combinations of these, and the like. Preferred oligo/resin materials are aliphatic in that aliphatic materials tend to have good weatherability properties.

For outdoor applications, polyurethane and (meth)acrylic-containing oligo/resins are preferred due to the tendency of these materials to have excellent durability and weatherability characteristics. Such materials also tend to be readily soluble in curable fluids formed from radiation curable, (meth)acrylate functional monomers.

Because aromatic constituents of oligo/resins generally tend to have poor weatherability and/or poor resistance to sunlight, aromatic constituents are preferably limited to less than about 5 weight percent, preferably less than about 1 weight percent, and more preferably are substantially excluded from both the oligo/resins and the curable fluid of the present invention. Accordingly, straight-chained, branched and/or cyclic aliphatic and/or heterocyclic ingredients are preferred for forming oligo/resins to be used in outdoor applications.

Optionally, the high molecular weight oligo/resins of the present invention may include functionality to help enhance the performance of the compositions of the present invention. For example, these materials may include radiation curable functionality to allow these materials to copolymerize or crosslink with the curable fluid and/or with the surface-treated nanoparticles upon exposure to a suitable energy source. To allow the high molecular weight species to form an interpenetrating polymer network with the curable fluid, high molecular weight species may include a different kind of curing functionality such as pendant hydroxyl groups or the like. In the presence of an isocyanate crosslinking agent, pendant hydroxyl moieties will undergo urethane curing reactions with the NCO groups of the isocyanate crosslinking agent to form a cured network comprising urethane linkages.

The oligo/resins themselves may be straight-chained, branched, and/or cyclic. Branched oligo/resins are preferred in that such materials tend to have lower viscosity than straight-chain counterparts of comparable molecular weight. The amount of oligo/resin materials incorporated into fluid compositions of the present invention may vary within a wide range depending upon such factors as the intended use of the resultant composition, the nature of the curable fluid, the nature of the oligo/resin(s), the weight average molecular weight of the oligo/resins, and the like. As general guidelines, ink jettable fluid compositions may include from about 0.1 to about 50 weight percent of oligo/resins, wherein polymer species preferably may comprise from about 0.1 to about 30, preferably from about 5 to about 20 weight percent of the composition. Oligomer species may comprise from about 0.1 to about 50, preferably from about 15 to about 40 weight percent of the composition. Suitable radiation curable oligo/resins for use in the present invention include, but are not limited to, those based upon urethane, amide, imide, epoxy, polyester, polyether, silicone, (meth)acrylic functionality and combinations of these, and the like.

Preferred (meth)acrylated aliphatic urethanes are di(meth)acrylate esters of hydroxy terminated NCO extended aliphatic polyesters or aliphatic polyethers. (Meth)acrylated polyesters are also preferred and representative embodiments are the reaction products of (meth)acrylic acid with an aliphatic dibasic acid/aliphatic diol-based polyester. Examples of commercially available (meth)acrylated urethanes and polyesters include those known by the trade designations PHOTOMER (Henkel Corp. of Hoboken, N.J.).;EBECRYL 284, 810, 4830, 8402, 1290, 1657, 1810, 2001, 2047, 230, 244, 264, 265, 270, 4833, 4835, 4842, 4866,4883, 657, 770, 80, 81, 811, 812, 83,830, 8301, 835, 870, 8800, 8803, and 8804 (UCB Radcure Inc. of Smyrna, Ga.); SARTOMER CN series CN964 B-85, CN292, CN704, CN816, CN817, CN818, CN929, CN944B-85, CN945A-60, CN945B-85, CN953, CN961, CN962, CN963, CN 965, CN966, CN968, CN980, CN981, CN982, CN983, CN984, and CN985 (Sartomer Co. of Exton, Pa.); ACTILANE (Akcross Chemicals of New Brunswick, N.J.); and UVITHANE (Morton International of Chicago, Ill.).

Preferred (meth)acrylated (meth)acrylics are (meth)acrylic oligomers or polymers that have reactive pendant or terminal (meth)acrylic acid groups capable of co-polymerization in subsequent reaction. Examples of commercially available (meth)acrylated (meth)acrylics include those known by the trade designations EBECRYL 745, 754, 767, 1701, and 1755 from UCB Radcure Inc., Smyrna, Ga. Other oligo/resin examples include polymers available under the trade designations ELVACITE 2014 (ICI Acrylics, Inc., Wilmington, Del.); JONCRYL 587 (S.C. Johnson, Racine, Wis.); and ACRYLOID B series and PARALOID B series such as PARALOID B-60 (Rohm & Haas Co., Philadelphia, Pa.).

Another particularly preferred class of radiation curable, urethane oligomers is described in Assignee's co-pending U.S. patent application Ser. No. 09/711346, entitled INKS AND OTHER COMPOSITIONS INCORPORATING LOW VISCOSITY, RADIATION CURABLE, POLYESTER URETHANE OLIGOMER, the entire disclosure of which is incorporated herein by reference. These radiation curable, urethane oligomers are generally characterized by atypically low viscosity characteristics, have a relatively high urethane content, are very economical to manufacture, and are compatible with a wide range of porous and nonporous substrates.

Other Additives

In addition to the curable fluid and the rheology modifying agent, one or more other ingredients may be incorporated into compositions of the present invention in accordance with conventional practices. These optional additives include one or more of solvents, photoinitiators, dyes, pigments, antifoaming agents, flow or other rheology control agents, oils, plasticizers, binders, antioxidants, photoinitiator stabilizers, fungicides, bactericides, organic and/or inorganic filler particles, leveling agents, opacifiers, antistatic agents, dispersants, and the like. In some embodiments, it is preferred that the uncured, ink jettable compositions of the present invention contain substantially no solvent. Substantially no solvent means that the uncured ink contains less than about 10, preferably less than about 2, more preferably less than about 0.5 weight percent of solvent at the ink jet print head.

Preferably, the composition of the invention comprises an initiator of polymerization. In one embodiment, this initiator may include a photoinitiator to absorb and utilize the light energy to initiate photopolymerization when light energy is used as the curing energy. Photoinitiators suitable for the process are those commonly used in the polymerization of free radically polymerizable materials are well within the skill of those practicing in the field.

Among the well-known photoinitiators of this type are the acyloin ethers (such as benzoin ethyl ether, benzoin isopropyl ether, anisoin ethyl ether and anisoin isopropyl ether), substituted acyloin ethers (such as alpha-hydroxymethylbenzoin ethyl ether), Michler's ketone (4,4'-tetramethyldiaminobenzophenone); benzoin and its derivatives alpha-phenylbenzoin, alpha-allylbenzoin, alpha-benzylbenzoin; benzoin ethers such as benzoin isopropyl ether, benzil dimethyl ketal (commercially available under the trade designation "IRGACURE 651" from Ciba-Geigy of Ardsley, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba-Geigy Corp. of Ardsley, N.Y.) and 1-hydroxycyclohexyl phenyl ketone (HCPK) (commercially available under the trade designation "IRGACURE 184", also from Ciba-Geigy Corp.); 2-methyl-1-[4-(methylthio)phenyl-2-(4-morpholinyl)-1-propanone commercially available under the trade designation "IRGACURE 907", also from Ciba-Geigy Corp.); and 2-benzyl-2-(dimethylamino)-1-[4-(4-morpholinyl)phenyl]-1-butanone commercially available under the trade designation "IRGACURE 369", also from Ciba-Geigy Corp.). Other useful photoinitiators include pivaloin ethyl ether, anisoin ethyl ether, anthraquinones such as anthraquinone, 2-methylanthraquinone, 2-ethylanthraquinone, 2-t-butylanthraquinone, 1-chloroanthraquinone, 2-bromoanthraquinone, 2-nitroanthraquinone, anthraquinone-1-carboxaldehyde, anthraquinone-2-thiol, 4-cyclohexylanthraquinone, 1,4-dimethylanthraquinone, 1-methoxyanthraquinone, benzathraquinone, halomethyltriazines, onium salts, for example, diazonium salts such as phenyldiazonium hexafluorophosphate and the like, diaryliodonium salts such as ditolyliodonium hexafluoroantimonate and the like, sulfonium salts such as triphenylsulfonium tetrafluoroborate and the like, titanium complexes such as those available under the trade designation "CGI 784 DC", also from Ciba-Geigy Corp.), uranyl salts such as uranyl nitrate, uranyl propionate, halomethylnitrobenzenes such as 4-bromomethylnitrobenzene and the like, mono- and bis-acylphosphines such as those available from Ciba-Geigy under the trade designations "IRGACURE 1700," "IRGACURE 1800," "IRGACURE 1850," and "DAROCUR 4265," and the like.

Typically, the curable compositions comprise from about 0.005 up to about 5 percent by weight of a photoinitiator, preferably from about 0.01 up to about 2 weight percent, and most preferably from about 0.05 up to about 0.5 weight percent, based upon the total weight of the precursor.

In addition to, or as an alternative to, free radical photoinitiators, other kinds of initiators may also be used. For example, useful cationic photoinitiators comprising onium salts have the general structure A-X wherein A is an organic cation selected from diazonium, iodonium, and sulfonium cations. More preferably A is selected from diphenyliodonium, triphenylsulfonium and (phenylthiophenyl)diphenylsulfonium; and X is an anion, the counterion of the onium salts in which X is an organic sulfonate, or halogenated metal or metalloid. Particularly useful onium salts include, but are not limited to, aryl diazonium salts, diaryliodonium salts, and triarylsulfonium salts. Additional examples of the onium salts are described in U.S. Pat. No. 5,086,086, col.4, lines 29–61.

Thermal free-radical initiators useful in the present invention include, but are not limited to azo, peroxide, and redox initiators. Suitable thermal initiators are to be chosen so as to not prematurely initiate the polymerization during storage, in the print reservoir, or in the print head. Preferably, the activation temperature for the initiator is above the temperatures the adhesive composition is exposed to during storage, in the print reservoir, and the printhead. Once printed, the adhesive composition can be heated to the appropriate temperature to activate the initiator and trigger the polymerization.

Suitable azo initiators include, but are not limited to, 2,2'-azobis(isobutyronitrile) (VAZO 64), 2,2'-azobis(2-methylbutyronitrile)(VAZO 67), 1,1'-azobis(1-cyclohexadecanecarbonitrile) (VAZO 88), all of which are available from DuPont Chemicals. Suitable peroxide initiators include, but are not limited to, benzoyl peroxide, lauroyl peroxide, and dicumyl peroxide. Suitable redox initiators include, but are not limited to, combinations of the above listed peroxides plus reducing amines such as tertiary amines; and the like.

For some PSA applications, crosslinking is also desired, particularly where it is desired to increase the cohesive strength of the adhesive without unduly affecting its compliance. This can be achieved by utilizing a suitable crosslinking agent in conjunction with the initiator. Typically, any crosslinker, if present, is in an amount of from about 0.005 up to about 1 weight percent based on the total weight of the precursor, more preferably from about 0.01 to about 0.5 weight percent.

Useful crosslinking agents include benzophenones, anthraquinones, substituted triazines such as 2,4,-bis(trichloromethyl)-6-(4-methoxy phenyl)-s-triazine, 2,4-bis(trichloromethyl)-6-(3,4-dimethoxyphenyl)-s-triazine, and the chromophore-substituted halo-s-triazines disclosed in U.S. Pat. Nos. 4,329,384 and 4,330,590 (Vesley). Other useful crosslinking agents include multifunctional alkyl (meth)acrylate monomers such as trimethylolpropane tri (meth)acrylate, pentaerythritol tetra(meth)acrylate, 1,2-ethylene glycol di(meth)acrylate, 1,4-butanediol di(meth) acrylate, 1,6-hexanediol di(meth)acrylate, and 1,12-dodecanol di(meth)acrylate. Various other crosslinking agents include multifunctional vinyl ethers.

Properties of Ink Jettable Compositions

Radiation curable, ink jettable embodiments of the present invention advantageously tend to have sufficiently low viscosity properties when placed under shear, heated, and/or subjected to other forms of energy so that the fluid compositions advantageously may be applied to receiving substrates using ink jetting techniques. Preferably, compositions of the present invention have a viscosity of below about 30 mPa·s, preferably below about 25 mPa·s, more preferably below about 20 mPa·s measured at a shear rate of $1000 \text{ s}^{-1}$ at the desired ink jetting temperature. However, the optimum viscosity characteristics for a particular composition will depend upon the type of ink jet system that will be used to apply the composition onto the substrate. For example, for piezo ink jet applications, a typical desired viscosity is from about 1 to about 30, preferably from about 5 to about 15 mPa·s measured at a shear rate of 1000 s$^{-1}$ at the print head temperature. Due to potential volatility and reactivity of one or more constituents of the radiation curable compositions, the fluid compositions preferably are jetted at temperatures no higher than about 120° C., and more preferably no higher than about 60° C.

As another preferred characteristic that is desirable for ink jetting applications, fluid compositions of the present invention desirably have moderate to low surface tension properties at the printhead temperature, preferably when subjected to a shearing force. Preferred formulations have a surface tension in the range of from about 20 dynes/centimeter to about 50 dynes/centimeter, more preferably in the range of from about 22 dynes/centimeter to about 40 dynes/centimeter at the printhead operating temperature. Most radiation curable, monomeric constituents (also sometimes referred to as the "reactive fluid" or "fluid carrier") to be incorporated into the radiation curable component of the invention already have surface tension characteristics in the preferred ranges. Therefore, formulating fluid compositions of the present invention with appropriate surface tension characteristics for ink jet applications is easily accomplished.

Methods of Preparation

The compositions of the present invention may be made using a wide range of methodologies. For example, many suitable methods can be used to form a preferred embodiment of the invention, where the compositions comprise a rheology modifying agent.

According to one approach in this preferred embodiment, the desired inorganic oxide particles are first surface-modified. Surface modification of inorganic particles can be carried out in water or in a mixture of water and one or more co-solvents, depending on the particular surface treatment agent used. Surface modification can be conveniently performed at or below about 45 weight percent inorganic particles, preferably about 15 to about 25 weight percent inorganic particles.

The starting colloidal dispersion can be diluted with water and/or co-solvent such as an alcohol or the like to obtain the desired inorganic particle content. Alcohols such as ethanol, isopropyl alcohol, methoxy-2-propanol, and the like are preferred as the co-solvent. The co-solvent may be used in a wide range of amounts in order to help solubilize one or more components of the composition and/or to help with water removal. For example, using about 1 to about 2 parts by weight of co-solvent per one part by weight of the starting colloidal dispersion of inorganic particles would be suitable.

The weight ratio of surface treatment agent to inorganic particles necessary to achieve good coverage, preferably substantially monolayer coverage, depends on factors such as the molecular weight of the surface treatment agent and the particle size and chemical composition of the colloids. For example, 20-nanometer silica particles require about 0.6 millimole silane per gram of silica, whereas 75-nanometer silica particles require about 0.16 millimole silane per gram of silica.

The colloidal dispersion of surface-treated particles, the desired fluid, and other optional ingredients of the nanocomposite composition, may then be combined and mixed thoroughly to obtain a homogeneous dispersion. Enough fluid is used such that the combination has about 5 to about 50, preferably about 15 to about 40 weight percent of particles (exclusive of the surface treatment agents) per 100 parts by weight of the precursor. The other additives are used in amounts in accordance with conventional practices. Solvent(s) is then removed, if necessary, until the composition has the desired amount of solvent. For radiation curable compositions, preferably the solvent is removed such that the composition is substantially solvent-free. Solvent may be removed using any suitable technique. A thermally reversible gel or thixotropic composition of the present invention is the result.

Application of Compositions

The compositions of the present invention may be applied to a substrate in any suitable fashion, e.g., ink jetting onto a receiving substrate such as wood, metal, paper, woven or nonwoven fabrics, resin-coated paper, foil, electronic circuitry, polymer articles, polymer films, and the like. Representative examples of other coating techniques include screen printing, spraying, gravure coating, knife coating, brushing, curtain coating, flexography and the like.

Compositions of the present invention are highly compatible with both porous and nonporous substrates. The compatibility with nonporous materials allows these compositions to be applied onto a wide range of nonporous polymer films, including single and multilayer constructions comprising films of poly(vinyl chloride) (including vinyl, plasticized vinyl, reinforced vinyl and vinyl/(meth)acrylic blends), polybutylene terephthalate, polyester (e.g., polyethylene terephthalate), acrylonitrile-butadiene-styrene copolymer, polystyrene (e.g., high impact polystyrene), polycarbonate, polyurethane, epoxy, polyimide (including copper- and/or gold-coated polyimide), polyamide, polymethyl(meth)acrylate, modified polyolefin, polyamideimide, poly(meth)acrylate, polyacrylamide, melamine resin, polyvinyl butyral and its copolymers, combinations of these, and the like. Because radiation curing generates little if any heat, the compositions of the present invention may be used on heat-sensitive substrates as well.

Substrates may be films that have two major surfaces with one or both surfaces being able to receive an ink jet PSA image of the present invention. Such PSA films can be clear, translucent, or opaque.

After being coated, curable compositions may be cured using a suitable fluence and type of curing energy. The amount of curing energy to be used for curing depends upon a number of factors, such as the amount and the type of reactants involved, the energy source, the web speed (if cured on web), the distance from the energy source, and the thickness of the material to be cured. Generally, the rate of curing tends to increase with increased energy intensity. The rate of curing also may tend to increase with increasing amounts of catalyst and/or initiator present in the composition. As general guidelines, actinic radiation typically involves a total energy exposure from about 0.1 to about 10 Joules/cm$^2$ and electron beam radiation typically involves a total energy exposure in the range from less than 1 to 100 Megarads or more, preferably 1 to 10 Megarads. Exposure times may be from less than about 1 second up to about 10 minutes or more. Radiation exposure may occur in air or in an inert atmosphere, such as nitrogen or $CO_2$.

After coating, any solvents present in radiation curable compositions of the invention, if any, may be flashed off with heat. Alternatively, if only a moderate amount of solvent is present, the solvent may be removed at the same time that radiation curing is carried out. The cured adhesive may be protected by a release liner.

The method of the invention advantageously utilizes an ink-jet printer to apply and form PSA features, e.g., films or patterns, on the desired substrate. Various types of ink-jet printers are known, including thermal inkjet printers, continuous inkjet printers, and piezoelectric inkjet printers (i.e., "piezo inkjet"). Thermal inkjet printers and printheads are readily commercially available from printer manufacturers such as Hewlett-Packard Corp. of Palo Alto, Calif., USA; Lexmark International of Lexington, Ky., USA; and others. Embodiments of ink jet printing devices with versatile printing capabilities are also described in Assignee's co-pending application Ser. No. 09/751,142 titled MULTIPLE RESOLUTION FLUID APPLICATOR AND METHODS, filed Dec. 29, 2000.

In order to prevent premature curing of the precursor, the method of the invention preferably employs a piezoelectric ink-jet printer. Piezo inkjet print heads are commercially available from Calcomp Technology Inc. of Los Angeles, Calif., USA; U.S. Epson Inc. of Torrance, Calif., USA; Data Products Corp. of Woodland Hills, Calif., USA; Xaar Ltd. of Cambridge, United Kingdom; and others. Such print heads are used in piezo inkjet printers commercially available from Idanit Technologies, Ltd. of Rishon Le Zion, Israel; Raster Graphics, Inc. of San Jose, Calif., USA; Trident International, Inc. of Brookfield, Conn.; Vutek, Inc. of Meredith, N.H., USA; Olympus Optical Co. Ltd. of Tokyo, Japan; and others.

EXAMPLES

All amounts given in the following examples are parts by weight, unless noted otherwise. The following materials and abbreviations were used in the examples that follow:

"A-174" refers to SILQUEST A-174, which is a trade designation for gamma-methacroyloxypropyltrimethoxysilane available from OSI Specialties Inc. of Endicott, N.Y., USA;

"AA" refers to acrylic acid, "2-EHA" refers to 2-ethylhexyl acrylate, "MMA" refers to methyl methacrylate, "HEMA" refers to 2-hydroxyethyl methacrylate, "MeSty" refers to alpha-methylstyrene, each available from Aldrich Chemical Company of Milwaukee, Wis., USA;

"ABP" refers to 4-acryloxybenzophenone, which is the reaction product of acryloyl chloride and 4-hydroxybenzophenone both available from Aldrich Chemical Company of Milwaukee, Wis., USA;

"AEROSIL R-972" fumed silica was from Degussa Corp. of Ridgefield Park, N.J., USA;

2,4-Bis(trichloromethyl)-6-p-methoxyphenyl-s-triazine (MOPT) was prepared as disclosed by Wakabayashi et al. in the *Bull. Chem. Soc. Japan*, Vol. 42, p. 2924 (1969);

"CAB-O-SIL M5" fumed silica was obtained from Cabot Corp. of Tuscola, Ill., USA;

"IBOA" refers to isobornyl acrylate, "LA" refers to lauryl acrylate and "IOA" refers to isooctyl acrylate, "HDDA" refers to 1,6-hexanediol diacrylate. All are available from Sartomer Company of Exton, Pa., USA;

"IOTMS" refers to isooctyltrimethoxysilane [also known as trimethoxy(2,4,4-trimethylpentyl)silane] having the trade name BS 1316 available from Wacker Silicones Corporation of Adrian, Mich., USA;

"IRGACURE 651" is a trade designation for benzil dimethyl ketal available from Ciba Specialty Chemicals of Tarrytown, N.Y., USA;

"KB-1" stands for "ESACURE KB-1," which is a trade designation for benzil dimethyl ketal available from Sartomer Company of Exton, Pa., USA;

"NALCO 2327" is a trade designation for colloidal silica (41.5% by weight $SiO_2$) available from Nalco Chemical, of Naperville, Ill., USA;

"NOA" refers to N-octylacrylamide available from National Starch and Chemical Company of Bridgewater, N.J., USA;

"PEG2TES" refers to methoxyethoxyethoxyureidopropyltriethoxysilane prepared as follows: A 250 ml round-bottomed flask equipped with a magnetic stir bar was charged with diethylene glycol methyl ether (35 grams) and methyl ethyl ketone (77 grams). A majority of the solvent was removed via rotary evaporation. Then, 3-(triethoxysilyl) propyl-isocyanate (68.60 grams, United Chemical Technologies, Petrarch Systems of Bristol, Pa., USA) was charged to the flask. Dibutyltin dilaurate (approximately 3 milligrams) was added and the mixture was stirred. The reaction proceeded with a mild exotherm and ran for approximately 16 hours, at which time infrared spectroscopy showed no isocyanate. The remainder of the solvent and alcohol was removed via rotary evaporation (90° C.) to yield PEG2TES as a somewhat viscous liquid (104.5 grams); and "SANTICIZER 141" is a trade designation for 2-ethylhexyl diphenyl phosphate, a plasticizer from Monsanto Co. of St. Louis, Mo., USA;

Example 1

This example describes the preparation of acrylate oligomers P1–P4 suitable for ink jet printing.

Acrylate oligomers were made by bulk polymerizing monomer mixtures according to the procedure described in U.S. Pat. No. 5,637,646 (Ellis) and using the formulations given in Table 1.

TABLE 1

Adhesive Precursor Compositions

| Oligomer | IOA | AA | MMA | HEMA | MeSty | IBOA | Styrene | ABP | $M_w$ | $M_n$ |
|---|---|---|---|---|---|---|---|---|---|---|
| P1 | 87 |    | 3  | 10 |    |    |    | 0.5 | 66,900 | 9,700 |
| P2 | 83 |    |    |    | 5  | 12 |    | 0.5 | 28,000 | 4,200 |
| P3 | 70 | 20 |    |    |    |    | 10 | 0.5 | 67,900 | 16,100 |
| P4 | 85 |    | 15 |    |    |    |    | 0.5 | 76,100 | 8,700 |

$M_n$ and $M_w$ are reported in grams/mole and were determined by gel permeation chromatography.
Amounts of reactants in Table 1 are in parts per hundred by weight.

Example 2

This example demonstrates the preparation of jettable precursor formulations A1–A6. Adhesive formulations were prepared according to relative amounts of reactants as described in Table 2 by dissolving the (meth)acrylate oligomers in IOA/AA monomers, and adding the photoinitiator and crosslinker. In the cases where fumed silica was used, the silica particles were mixed with the monomers and stirred with a mechanical stirrer to produce gel like suspensions.

TABLE 2

Jettable Adhesive Precursor Formulations

| Formulation | IOA | AA | Silica Source/ amount | Oligomer/ amount | KB-1 | MOPT |
|---|---|---|---|---|---|---|
| A1 | 63 | 7 | | P1/30 | 0.14 | 0.15 |
| A2 | 63 | 7 | | P2, 30 | 0.14 | 0.15 |
| A3 | 72 | 8 | | P3, 20 | 0.14 | 0.15 |
| A4 | 63 | 7 | | P4, 30 | 0.14 | 0.15 |
| A5 | 86.4 | 9.6 | CAB-O-SIL M5/4 | None | 0.14 | 0.15 |
| A6 | 86.4 | 9.6 | AEROSIL R-972/4 | None | 0.14 | 0.15 |

Amounts of reactants in Table 2 are in parts per hundred by weight.

Example 3

This example describes the printing of precursor formulations A1–A6. In separate procedures, precursor formulations A1–A6 were respectively added to the printhead reservoir attached to a Trident MICROCODER piezo inkjet printhead available from Trident International, Inc. of Brookfield, Conn., USA with 50 micrometer orifices (Conditions were: P=−5.8, V1=0, V2=−100, T1=100 microsecond, T2=70 microsecond) and degassed for 2 hours at 50° C. The reservoir was then heated to 90° C. and the mixture was successfully printed onto a vertically oriented polyethylene terephthalate film having 37.5 micrometer thickness.

A rectangular image was printed by jetting each precursor onto a polyethylene terephthalate film wrapped on a rotating drum. This process was repeated until the printed adhesive layer reached a thickness of approximately 50 micrometers. The film with the printed pattern was placed in an ultraviolet (UV) curing chamber inerted with nitrogen and irradiated under a bank of black lights as described in U.S. Pat. No. 4,181,752 (Martens et al.) to produce a PSA pattern on the polyethylene terephthalate film.

Example 4

PSA patterned films prepared in Example 3 were tested for peel adhesion and shear strength.
90° Peel Adhesion Test:

Strips measuring 1.27 centimeters by 11.4 centimeters were cut from the PSA film, and the adhesive face was applied to a substrate panel (either stainless steel (denoted as SS) or polycarbonate (denoted as PC)). The strip was then pressed onto the substrate using four hand-passes with a 2.27 kilogram hard rubber roller. Before testing, the sample was aged for 48 hours at room temperature. After aging, the panel was mounted in a SINTECH TENSILE TESTER (available from MTS Systems Corp. of Eden Prairie, Minn.) so that the tape was pulled off at a 90° angle at a speed of 30.5 centimeters per minute. Results were determined in pounds per 0.5 inch and converted to N/dm.
Shear Strength Test:

Adhesive strips of 1.27 centimeter width were adhered to a stainless steel plate, the contact area being 1.27 centimeters by 2.54 centimeters. The strip was rolled under a 2.27 kilogram hard rubber roller. After 30 minutes, the plate was placed in an oven at 70° C., and positioned 2 degrees from the vertical to prevent peeling. A 500 gram mass was suspended from the free end of the strip, and the time (in minutes) at which the bond failed was noted.

TABLE 3

Adhesive Properties of Patterned Adhesive Films

| | Adhesive Formulation Number | | | | | |
|---|---|---|---|---|---|---|
| | A1 | A2 | A3 | A4 | A5 | A6 |
| Peel/SS | 1.72 | 1.8 | 1.75 | 1.66 | 1.68 | 2.03 |
| Peel/PC | 1.84 | 2.3 | 2.64 | 2.32 | 1.57 | 1.88 |
| Shear | >10000 | >10000 | >10000 | >10000 | >10000 | >10000 |

Example 5

This example describes the preparation of jettable precursor A7 and its use in printing to make a patterned adhesive.

To 300 parts NALCO 2327, was added with swirling 337 parts methoxyisopropanol, 14.8 parts A-174 and 7.11 parts PEG2TES were mixed together and added to the sol with swirling. The mixture was sealed in the container and heated to 80° C. for 20 hours resulting in a clear blue nonviscous sol (Sol A).

A monomer mixture of 45.5 parts LA, 34.7 parts IBOA, and 19.8 parts NOA was prepared (Monomer Mixture A). A reaction vessel was charged with 98.3 parts Sol A and 65.9 parts Monomer Mixture A. The water and alcohol were removed by rotary evaporation under reduced pressure followed by trap distillation. A clear gel was obtained. Oven drying gave a silica content of 22.5 weight percent. To the clear gel were added with mixing 20 weight percent SANTICIZER 141 plasticizer and 0.15 weight percent KB-1 photoinitiator (A7).

The resulting mixture was added to the printhead reservoir attached to a Trident MICROCODER piezo inkjet printhead available from Trident International, Inc. of Brookfield, Conn., USA with 50 micrometer orifices (Conditions were: P=−5.8, V1=0, V2=−100, T1=100 microsecond, T2=70 microsecond) and degassed for 2 hours at 50° C. The reservoir was then heated to 65° C. and the mixture was successfully printed onto a vertically oriented polyethylene terephthalate film having a 37.5 micrometer thickness.

The printed image, which maintained its shape on the vertical substrate, was then cured for 3 minutes in an oxygen free environment using a black light obtained from Osram Sylvania Inc. of Danvers, Mass. (Part No. F15T8/350BL) using a dose of from 350 to 450 mJ/cm$^2$ at the curing surface to give a PSA.

Example 6

This example describes the preparation of jettable precursor A8 and its use in printing to make a patterned adhesive.

NALCO 2327 (300 parts) was added with swirling 337 parts methoxyisopropanol, 7.08 parts PEG2TES, and 13.47 parts IOTES. The mixture was sealed in the container and heated to 80° C. for 20 hr resulting in a clear blue nonviscous sol (Sol B).

A monomer mixture of 96.2 parts 2-EHA, 3.70 parts NOA, and 0.10 part HDDA was prepared (Monomer Mixture B). A reaction vessel was charged with 100 parts Sol B and 66.3 parts Monomer Mixture B. The water and alcohol were removed by rotary evaporation under reduced pressure followed by trap distillation. A clear blue free flowing liquid was obtained. Oven drying gave a silica content of 22 weight percent. To the clear blue liquid was added with mixing 0.15 weight percent KB-1 photoinitiator (A8). The resulting mixture was added to the printhead reservoir attached to a Trident MICROCODER piezo inkjet printhead available from Trident International, Inc. of Brookfield, Conn., USA with 50 micrometer orifices (Conditions were: P=−5.8, V1=0, V2=−100, T1=100 microseconds, T2=70 microseconds) and degassed for 45 minutes at 50° C. The reservoir was then heated to 50° C. and successfully printed onto a vertically oriented polyethylene terephthalate film having a 37.5 micrometer thickness.

The printed image, which maintained its shape on the vertical substrate, was then cured for 3 minutes in an oxygen free environment using a black light obtained from Osram Sylvania Inc. of Danvers, Mass. 01923 (Part No. F15T8/350BL) using a dose of from 350 to 450 mJ/cm² at the curing surface to give a PSA.

The following test procedures were used in the examples below:

180° Peel Adhesion Test:

This test is similar to the test method described in ASTM D 3330-90, substituting a glass substrate for the stainless steel substrate described in the test. For the present purpose, this test is also referred to as the "glass substrate peel adhesion test."

Adhesive coatings, having a thickness as indicated in the particular example, on polyester film were cut into 1.27 centimeter by 15 centimeter strips. Each strip was then adhered to a 10 centimeter by 20 centimeter clean, solvent-washed, glass coupon using a 2-kilogram roller passed once over the strip. The bonded assembly dwelled at room temperature for about one minute.

The bonded assembly was then tested for 180° peel adhesion using an IMASS SLIP/PEEL TESTER (Model Number 3M90, commercially available from Instrumentors Inc.; Strongsville, Ohio) at a rate of 2.3 meters per minute (90 inches per minute) over a five second data collection time. Two samples of each composition were tested. The reported peel adhesion value is an average of the peel adhesion value obtained from testing each of the two samples. The 180° peel numbers were obtained following ASTM test method D3330-96, Peel Adhesion of PSA Tape at 180° angle.

Shear Strength Test:

This test is similar to ASTM D 3654-88. Adhesive coatings, having a thickness as indicated in the particular example, on polyester film were cut into 1.27 centimeter by 15 centimeter strips. Each strip was then adhered to a stainless steel panel such that a 1.27 centimeter by 1.27 centimeter portion of each strip was in firm contact with the panel, with one end portion of the strip hanging free. The panel with the strip attached was held in a rack such that the panel formed an angle of 178° with the extended strip free end that was tensioned by application of a force of one kilogram applied as a hanging weight from the free end of the strip. The 2° less than 180° was used to negate any peel forces, thus ensuring that only shear strength forces were measured, in an attempt to more accurately determine the holding power of the tape being tested.

The time elapsed for each sample to separate from the test panel was recorded as the shear strength. Each test was terminated at 10,000 minutes, unless the adhesive failed at an earlier time (as noted).

Failure Modes: "Adhesive Failure" means that the adhesive debonded from the substrate to which it was bonded. "Bond Failure" means that adhesive debonded from the backing onto which it was printed. "Cohesive Failure" means that the adhesive itself failed (i.e., part of the adhesive was left on the substrate to which it was bonded and the remaining part of the adhesive was left on the backing on which it was printed).

Example 7

This example describes the preparation of surface-modified silica particles useful in the preparation of jettable precursors.

Preparation of IOTMS/PEG2TES (62.5/37.8) surface-modified silica in 2-EHA: NALCO 2327 colloidal dispersion (400.04 grams) was charged to a 0.9 Liter jar. Then, 1-methoxy-2-propanol (450.32 grams), 14.19 grams PEG2TES, and 15.24 grams IOTMS were mixed together and added to the colloidal dispersion with stirring. The jar was sealed and heated to 80° C. for 17 hours resulting in a white slurry of modified silica. A 1-Liter round-bottom flask was charged with 278.84 grams slurry and 138.76 grams 2-EHA. Water and alcohol were removed via rotary evaporation at reduced pressure until the total solid weight was 190.1 grams.

The flask was removed and an additional 181.88 grams slurry and 90.89 grams 2-EHA were added. The remaining alcohol and water were removed via rotary evaporation at reduced pressure. A gray/white somewhat viscous phase separated mixture was obtained. Gas chromatography confirmed that no alcohol remained in the sample. The procedure was repeated using a total of 343.1 grams slurry and 170.7 grams 2-EHA. Both mixtures were combined to give a total solids content of 30.33 weight percent (Dispersion 1).

Preparation of IOTMS/PEG2TES (75/25) surface-modified silica in 2-EHA: NALCO 2327 colloidal dispersion (400.39 grams) was charged to a 0.9 Liter jar. Then, 1-methoxy-2-propanol (450.02 grams), 9.50 grams PEG2TES, and 18.14 grams IOTMS were mixed together and added to the colloidal dispersion with stirring. The jar was sealed and heated to 80° C. for 17 hours, resulting in a white slurry of modified silica. A 2-liter round bottom flask was charged with 859.0 grams of the slurry and 304.17 grams 2-EHA. The water and alcohol were removed via rotary evaporation at reduced pressure at 64° C. A gray/white somewhat viscous phase separated mixture was obtained.

The flask was removed and gas chromatography confirmed that no alcohol remained in the sample. A total solids content of 39.38 weight percent was measured, 2-EHA was added and mixed in via shaking to bring the total solids content to 30.30 weight percent (Dispersion 2).

Preparation of IOTMS/PEG2TES (85/15) surface-modified silica in 2-EHA: NALCO 2327 colloidal dispersion (400.52 grams) was charged to a 0.9 Liter jar. Then, 1-methoxy-2-propanol (450.53 grams), 5.67 grams PEG2TES, and 20.49 grams IOTMS were mixed together and added to the colloidal dispersion with stirring. The jar was sealed and heated to 80° C. for 17 hours, resulting in a white slurry of modified silica. A 1-Liter round-bottom flask was charged with 266.42 grams of the slurry and 136.56 grams 2-EHA. The water and alcohol were removed via rotary evaporation at reduced pressure until the total solid weight was 184.13 grams.

The flask was removed and an additional 152.02 grams slurry and 75.46 grams 2-EHA were added. The remaining alcohol and water were removed via rotary evaporation at reduced pressure. A gray/white somewhat viscous mixture was obtained. Gas chromatography confirmed that no alcohol remained in the sample. The procedure was repeated using a total of 560.55 grams slurry and 287.8 grams 2-EHA. The two mixtures were combined to give a total solids content of 26.44 weight percent (Dispersion 3).

Preparation of IOTMS/PEG2TES (85/15) surface-modified silica in 2-EHA: NALCO 2327 colloidal dispersion (400 grams) was charged to a 0.9 Liter jar. Then, 1-methoxy-2-propanol (450.07 grams), 5.65 grams PEG2TES, and 20.26 grams IOTMS were mixed together and added to the colloidal dispersion with stirring. The jar was sealed and heated to 80° C. for 17 hours, resulting in a white slurry of modified silica. A 2-Liter round-bottom flask was charged with 684.67 grams slurry and 299.84 grams 2-EHA. Water and alcohol were removed via rotary evaporation at reduced pressure. A gray/white somewhat viscous slightly phase separated mixture was obtained. Gas chromatography confirmed that no alcohol remained in the sample. A total solids content of 34.09 weight percent was measured (Dispersion 4).

Preparation of IOTMS/PEG2TES (93/7) surface-modified silica in 2-EHA: NALCO 2327 colloidal dispersion (400.31 grams) was charged to a 0.9 Liter jar. Then, 1-methoxy-2-propanol (449.25 grams), 2.64 grams PEG2TES, and 22.39 grams IOTMS were mixed together and added to the colloidal dispersion with stirring. The jar was sealed and heated to 80° C. for 17 hours, resulting in a white slurry of modified silica. A 1-Liter round-bottom flask was charged with 290.16 grams slurry and 113.95 grams 2-EHA. The majority of water and alcohol were removed via rotary evaporation at reduced pressure.

The flask was removed and an additional 177.84 grams slurry and 83.20 grams 2-EHA was added. The remaining alcohol and water were removed via rotary evaporation at reduced pressure. A gray/white somewhat viscous slightly phase separated mixture was obtained. Gas chromatography confirmed that no alcohol remained in the sample. The procedure was repeated using a total of 349.28 grams slurry and 121.42 grams 2-EHA. The two mixtures were combined resulting in a total solids content of 35.66 weight percent (Dispersion 5).

Example 8

This example describes the preparation of jettable precursors A9–A23.

Dispersion 2 (40 grams) was added to a 240-milliLiter jar with 17.69 grams additional 2-EHA and 2.91 grams AA. The mixture was capped and shaken by hand approximately one minute until homogeneous. Then, 0.12 gram IRGACURE 651 photoinitiator and 0.055 gram HDDA were added and shaken by hand approximately one minute. The formulation was then placed into a 50° C. oven for 15 to 20 minutes to allow all ingredients to dissolve. During this time, the formulation was shaken by hand several times to ensure good mixing. The resulting formulation (precursor A9) was a clear blue thick liquid at room temperature. Oven dry down showed the $SiO_2$ level to be at 20.13 weight percent.

Adhesive precursors A10 through A23 were made following the procedure of Example 8 with variations as indicated in Table 4.

TABLE 4

| Adhesive Precursor | Dispersion | 2-EHA (wt. %) | AA (wt. %) | IBA (wt. %) | NOA (wt. %) | HDDA (wt. %) | KB-1 (wt. %) | Modified $SiO_2$ (wt. %) |
|---|---|---|---|---|---|---|---|---|
| A9 | 2 | 94 | 6 | 0 | 0 | 0.10 | 0.15 | 20 |
| A10 | 5 | 93 | 7 | 0 | 0 | 0.10 | 0.15 | 20 |
| A11 | 3 | 90 | 10 | 0 | 0 | 0.10 | 0.15 | 17.5 |
| A12 | 3 | 90 | 10 | 0 | 0 | 0.10 | 0.15 | 17.5 |
| A13 | 3 | 90 | 10 | 0 | 0 | 0.10 | 0.15 | 20 |
| A14 | 4 | 90 | 10 | 0 | 0 | 0.10 | 0.15 | 23 |
| A15 | 3 | 90 | 10 | 0 | 1 | 0.10 | 0.15 | 17.5 |
| A16 | 3 | 90 | 10 | 0 | 1 | 0.10 | 0.15 | 23 |
| A17 | 3 | 90 | 10 | 0 | 3 | 0.10 | 0.15 | 23 |
| A18 | 1 | 80 | 20 | 0 | 0 | 0.10 | 0.15 | 20 |
| A19 | 5 | 60 | 0 | 40 | 0 | 0.10 | 0.15 | 17 |
| A20 | 5 | 70 | 0 | 30 | 0 | 0.10 | 0.15 | 17 |
| A21 | 5 | 80 | 0 | 20 | 0 | 0.10 | 0.15 | 20 |
| A22 | 2 | 93 | 0 | 0 | 7 | 0.10 | 0.15 | 23 |
| A23 | 2 | 92 | 0 | 0 | 8 | 0.10 | 0.15 | 23 |

Example 9

This example shows the results of printing and curing of jettable precursors A9 through A23.

In separate procedures, each precursor was poured into the printhead reservoir and degassed for 30 minutes at 50° C. The formulation was then allowed to cool to 25° C., at which time the precursor was successfully printed onto a polyester terephthalate film (37.5 micrometer thickness) substrate using a MICROCODER piezo inkjet printhead with 50-micrometer orifices (Conditions were: P=−5.8, V1=0, V2=−100, T1=100 microseconds, T2=70 microseconds) from Trident International of Brookfield, Conn. The printed image, which maintained its shape on the vertical substrate, was then exposed in an oxygen free environment under black light (Sylvania bulb-part # F15T8/350BL from Osram Sylvania of Danvers, Mass.) with an emission dose from 350 to 450 $mJ/cm^2$ and a bulb distance of 2 to 3 inches from the sample being exposed. The samples were exposed to the UV light, as indicated, resulting in a PSA. Results are shown in Table 5.

TABLE 5

| Example | 180° Peel average at 30 cm/min in ounces (also reported in Newtons, N) | Shear Time (min) | Printed Thickness (micrometers) | Failure Mode | UV exposure (min) | Appearance |
|---|---|---|---|---|---|---|
| A9  | 23 (6.4 N)    | 343    | NM    | Cohesive | 4 | Clear |
| A10 | 27.7 (7.70 N) | 55     | 23    | Adhesive | 4 | Hazy |
| A11 | 21.7 (6.03 N) | >10000 | 230.9 | Adhesive | 4 | Clear |
| A12 | 22.6 (6.28 N) | NM     | 13    | Adhesive | 3 | Slightly Hazy |
| A13 | 20.4 (5.67 N) | NM     | 13    | Adhesive | 4 | Clear |
| A14 | 27.2 (7.56 N) | NM     | 13    | Adhesive | 4 | Hazy |
| A15 | 18 (5.00 N)   | NM     | 13    | Adhesive | 4 | Clear |
| A16 | 26.3 (7.31 N) | 814    | 25    | Adhesive | 3 | Clear |
| A17 | 26.9 (7.48 N) | NM     | 10    | Adhesive | 4 | Clear |
| A18 | 22.8 (6.34 N) | NM     | 20    | Adhesive | 5 | NM |
| A19 | 27.8 (7.73 N) | 310    | 23    | Adhesive | 4 | Clear |
| A20 | 32.5 (9.04 N) | 13     | 30    | Adhesive | 5 | Clear |
| A21 | 33 (9.2 N)    | NM     | 20    | Cohesive | 4 | Hazy |
| A22 | 20.7 (5.75 N) | 4      | 23    | Adhesive | 4 | Clear |
| A23 | 18 (5.0 N)    | 1      | 25    | Cohesive | 5 | Clear |

"NM" means not measured in Table 5.

Various modifications and alterations of the invention will become apparent to those skilled in the art without departing from the spirit and scope of the invention, which is defined by the accompanying claims. For example, it should be noted that steps recited in any method claims below do not necessarily need to performed in the order that they are recited. Those of ordinary skill in the art will recognize variations in performing the steps from the order in which they are recited. For example, in certain embodiments, steps may be performed simultaneously. The accompanying claims should be constructed with these principles in mind.

What is claimed is:

1. A curable composition that forms a pressure sensitive adhesive upon curing, comprising:

(a) a curable, fluid pressure sensitive adhesive precursor comprising a first, relatively polar constituent and a second, relatively nonpolar constituent, wherein at least one of the first and second constituents is radiation curable; and (b) a rheology modifying agent comprising surface-treatd, nanometer-sized inorganic oxide particles comprising relatively polar and nonpolar surface portions in relative amounts effective to render the rheology modifying agent marginally compatible with the fluid pressure sensitive adhesive precursor.

2. A method of making a composition that forms a pressure sensitive adhesive upon curing, comprising the steps of:

(a) providing a curable, fluid pressure sensitive adhesive precursor comprising a first, relatively polar constituent and a second, relatively nonpolar constituent, wherein at least one of said constituents is radiation curable; and (b) providing a rheology modifying agent comprising surface-treated, nanometer-sized, inorganic oxide particles comprising relatively polar and nonpolar surface portions in relative amounts such that the rheology modifying agent is marginally compatible with the curable, fluid pressure sensitive adhesive precursor; and (c) incorporating a rheology modifying amount of the agent into the precursor.

3. A method of forming a pressure sensitive adhesive composition on a substrate, comprising the steps of:

(a) providing a curable, fluid composition that forms a pressure sensitive adhesive upon curing comprising:

(i) a curable, fluid pressure sensitive adhesive precurscor comprising a first, relatively polar constituent and a second, relatively nonpolar constituent, wherein at least one of the first and second constituents is radiation curable; and ii) a rheology modifying agent comprising surface-treated, nanometer-sized inorganic oxide particles comprising relatively polar and nonpolar surface portions in relative amounts effective to render the rheology modifying agent marginally compatible with the fluid pressure sensitive adhesive precursor;

(b) ink jet printing the composition onto at least a portion of the substrate; and (c) curing the composition under conditions effective to form the pressure sensitive adhesive.

4. The method of claim 3, wherein the curable composition is energy curable.

5. The method of claim 4, wherein the non-adhesive material comprises retroreflective characteristics.

6. The method of claim 3, wherein the substrate comprises an electronic component.

7. The method of claim 3, wherein the substrate comprises a micro-mechanical device.

8. The method of claim 3, wherein the substrate comprises an imaged graphic article having an image thereon and the composition is printed over the image.

9. The method of claim 3, wherein steps (a)–(c) are repeated in a manner effective to build the thickness of at least a portion of the pressure sensitive adhesive.

10. The method of claim 3, wherein at least a portion of said curable composition is ink jetted through a piezoelectric ink jet printhead.

11. The method of claim 3, further comprising the step of ink jet printing a non-adhesive material onto the cured pressure sensitive adhesive.

12. The method of claim 3, wherein the cured adhesive has a thickness of at least about 10 micrometers.

13. The method of claim 3, wherein only a portion of the substrate is coated with the adhesive.

14. The method of claim 3, wherein the composition is printed in a manner effective to form a pattern on the substrate.

15. The method of claim 14, wherein only a portion of the substrate is coated with the pattern.

16. A method of forming a pressure sensitive adhesive composition on a substrate, comprising the steps of:
   (a) providing a rheology-modified, curable, fluid composition that forms a pressure sensitive adhesive upon curing, comprising:
      (i) a curable fluid that forms a pressure sensitive adhesive upon curing;
      (ii) at least a thickening amount or a rheology modifying agent comprising surface-treated, nanometer-sized inorganic oxide particles comprising relatively polar and nonpolar surface portions in relative amounts effective to render the rheology modifying agent marginally compatible with the curable fluid;
   (b) ink jet printing the composition onto at least a portion of the substrate; and
   (c) curing the composition under conditions effective to form the pressure sensitive adhesive.

17. The method of claim 16, wherein the composition is thixotropic.

18. The method of claim 16, wherein the composition is shear-thinning.

19. The method of claim 16, wherein the energy comprises thermal energy.

20. A method of forming a pressure sensitive adhesive composition on a substrate, comprising the steps of:
   (a) providing a curable, fluid composition that forms a pressure sensitive adhesive upon curing;
   (b) ink jet printing the composition onto at least a portion of the substrate; and
   (c) curing the composition under conditions effective to form the pressure sensitive adhesive,
   wherein the curable composition comprises reversible characteristics in which the curable, fluid composition exists as a thickened composition in a first state and as a fluid in a second state; and
   wherein the substrate comprises a micro-mechanical device.

21. The method of claim 20, wherein the curable composition is energy curable.

22. The method of claim 20, wherein the composition includes a rheology modifying agent that comprises an amount of nanometer-sized, surface-treated, inorganic oxide particles effective to provide the curable, fluid composition with the reversible characteristics.

23. The method of claim 20, wherein steps (a)–(c) are repeated in a manner effective to build the thickness of at least a portion of the pressure sensitive adhesive.

24. The method of claim 20, wherein at least a portion of said curable composition is ink jetted through a piezoelectric ink jet printhead.

* * * * *

UNITED STATES PATENT AND TRADEMARK OFFICE
CERTIFICATE OF CORRECTION

| | |
|---|---|
| PATENT NO. | : 6,883,908 B2 |
| APPLICATION NO. | : 09/756312 |
| DATED | : April 26, 2005 |
| INVENTOR(S) | : Young, James K. |

It is certified that error appears in the above-identified patent and that said Letters Patent is hereby corrected as shown below:

Title page,
Item [*] Notice, insert -- This patent is subject to a terminal disclaimer. --.

Column 6,
Lines 26-27, delete "$[A]_{m\text{-}B}$" and insert -- $[A]_m\text{-}B$ --.

Column 9,
Line 16, after "PARTICLES," insert -- bearing Attorney Docket No. 55433US21, and filed concurrently herewith in the names of Ylitalo et al., --.
Line 16, delete "incorpoiiated" and insert -- incorporated --.

Column 12,
Line 33, after "thereof" insert -- . --.

Column 13,
Lines 6-7, delete "$(X)_{r\text{-}W\text{-}(A)s}$" and insert -- $(X)_r\text{-}W\text{-}(A)_s$ --.

Column 21,
Line 11, delete "2000." and insert -- 2000, and bearing Attorney Docket No. 55361USA5A. --.

Column 29,
Line 45, delete "surface-treatd" and insert -- surface-treated --.

UNITED STATES PATENT AND TRADEMARK OFFICE
CERTIFICATE OF CORRECTION

PATENT NO. : 6,883,908 B2
APPLICATION NO. : 09/756312
DATED : April 26, 2005
INVENTOR(S) : Young, James K.

It is certified that error appears in the above-identified patent and that said Letters Patent is hereby corrected as shown below:

Column 30,
Lines 29-30, delete "precurscor" and insert -- precursor --.

Column 31,
Line 14, delete "or" and insert -- of --.
Line 29, after "16" delete ",".

Signed and Sealed this

Eleventh Day of July, 2006

JON W. DUDAS
*Director of the United States Patent and Trademark Office*